United States Patent
Grimm et al.

(10) Patent No.: US 7,505,233 B2
(45) Date of Patent: Mar. 17, 2009

(54) MAGNETIC SENSOR

(75) Inventors: Hubert Grimm, Mommenheim (DE); Jan Marien, Selzen (DE); Rolf Schaefer, Walluf (DE)

(73) Assignee: International Business Machines Corporation, Armonk, NY (US)

( * ) Notice: Subject to any disclaimer, the term of this patent is extended or adjusted under 35 U.S.C. 154(b) by 435 days.

(21) Appl. No.: 11/269,479

(22) Filed: Nov. 7, 2005

(65) Prior Publication Data

US 2006/0126229 A1  Jun. 15, 2006

(30) Foreign Application Priority Data

Dec. 15, 2004  (DE)  ................................. 04106588

(51) Int. Cl.
*G11B 5/39* (2006.01)
*H01L 43/00* (2006.01)

(52) U.S. Cl. ..................................... 360/321
(58) Field of Classification Search ................ 360/316, 360/321; 324/207.21, 252; 338/32 R; 235/440, 235/449, 493
See application file for complete search history.

(56) References Cited

U.S. PATENT DOCUMENTS

| | | | | |
|---|---|---|---|---|
| 4,100,583 | A * | 7/1978 | Koel et al. | 360/315 |
| 4,150,408 | A * | 4/1979 | Koel et al. | 360/318 |
| 4,300,177 | A * | 11/1981 | Koel et al. | 360/321 |
| 4,356,523 | A * | 10/1982 | Yeh | 360/315 |
| 4,789,910 | A * | 12/1988 | Otsuka et al. | 360/320 |
| 4,896,235 | A * | 1/1990 | Takino et al. | 360/327.3 |
| 4,954,920 | A * | 9/1990 | Yamada et al. | 360/315 |
| 5,027,245 | A * | 6/1991 | Nagata et al. | 360/121 |
| 5,115,364 | A * | 5/1992 | Somers | 360/316 |
| 5,402,292 | A * | 3/1995 | Komoda et al. | 360/327.31 |
| 5,469,317 | A * | 11/1995 | Nagata et al. | 235/375 |
| 5,714,747 | A * | 2/1998 | West et al. | 235/493 |
| 5,729,137 | A | 3/1998 | Daughton et al. | 324/252 |
| 5,821,517 | A * | 10/1998 | Fedeli et al. | 235/449 |
| 5,880,911 | A * | 3/1999 | Ishihara et al. | 360/324 |
| 6,075,360 | A * | 6/2000 | Mouchot et al. | 324/251 |
| 2004/0130323 | A1 * | 7/2004 | Oohashi et al. | 324/252 |
| 2005/0140363 | A1 | 6/2005 | Grimm et al. | 324/207.21 |

FOREIGN PATENT DOCUMENTS

JP  2003257007 A * 9/2003
JP  2004273059 A * 9/2004

* cited by examiner

*Primary Examiner*—William J Klimowicz
(74) *Attorney, Agent, or Firm*—Zilka-Kotab, PC (57) ABSTRACT

A magnetic sensor having at least a first and at least a second structure of soft-magnetic material that are spatially separated and define a first gap therebetween. The first and second structure of soft-magnetic material are adapted to form a gap magnetic field pointing in a direction substantially perpendicular to the elongation of the first gap in the vicinity of the first gap in response to an external magnetic field. Additionally, the magnetic sensor comprises at least a first magnetoresistive layered structure that is positioned in the vicinity of the first gap including inside the first gap and that is sensitive to the gap magnetic field.

18 Claims, 6 Drawing Sheets

MAGNETIC SENSOR

FIELD OF THE INVENTION

The present invention relates to the field of magnetic sensors making use of magnetoresistive layered structures featuring an electrical resistance that depends on a magnetic field.

BACKGROUND AND PRIOR ART

Magnetoresistive elements feature an electrical resistance that strongly depends on the magnitude and/or a direction of an externally applied magnetic field. Magnetoresistive elements therefore in principle provide efficient determination of magnetic field strength and magnetic field direction. For example, when the resistance of an element varies with the angle between the element and the direction of an applied magnetic field, by making use of such an element, a rotation angle can be effectively measured in a touch-less way.

Generally, there exists a large variety of different magnetoresistive elements making use of different fundamental effects. For example, the Anisotropic Magnetoresistive (AMR) effect shows a change in electrical resistance in the presence of a magnetic field. AMR sensors are typically made of soft-magnetic material, such as nickel-iron (Permalloy) thin film deposited on a silicon wafer. The magnetoresistive effect is mainly given by the relative direction between an electrical current and the direction of magnetization.

Another effect denoted as Giant Magneto Resistance (GMR) can be exploited by making use of a stack of alternatingly magnetic and non-magnetic layers. The magnetic layers are typically ferromagnetic. The magnetizations of adjacent ferromagnetic layers are coupled in an anti-parallel way, e.g., in the absence of a magnetic field, and the electrical resistance of such a GMR element strongly depends on the mutual orientation of the magnetization of adjacently positioned magnetic layers. Therefore, conventional GMR elements do not allow a direct determination of a direction of a magnetic field.

However, dedicated GMR systems, denoted as spin-valves also provide determination of a direction of the magnetic field. GMR spin-valve elements feature a magnetic anti-ferromagnetic layer with a fixed spatial orientation, the so called pinning layer. Generally, there is a strong coupling between the pinning layer, a ferromagnetic layer, and the so called pinned layer. A second ferromagnetic layer, the free layer, is adjacently positioned to the pinned layer. The relative orientation of the magnetization between the pinned layer and the free layer determines the electrical resistance of the layer structure. Because the magnetization of the free layer is weakly coupled to the magnetization of the pinned layer, the direction of the magnetization of the free layer follows the direction of an external magnetic field in a parallel way while the direction of the magnetization of the pinned layer cannot follow the direction of the external magnetic field. Hence the spin valve can measure the direction of a magnetic field.

As long as the interaction force between the external magnetic field and the magnetization of the free layer is stronger than the weak coupling force between the free layer and the pinned layer, the magnetization of the free layer is parallel to the direction of the external magnetic field. As long the interaction force between the external magnetic field and the magnetization of the pinned layer is weaker than the coupling force between the pinned layer and the pinning layer the direction of the magnetization of the pinned layer is independent of the external magnetic field. Hence, by means of a GMR spin valve, the direction of a magnetic field can be determined irrespective of its magnitude, given that the magnitude remains within a predefined margin.

In spin-valve systems as well as with AMR elements the electrical resistance depends on the angle between the magnetization of ferromagnetic layers and an intrinsic direction, the direction of anisotropy. This direction of anisotropy is defined by the pinned layer in GMR-spin valve systems and it is defined by the current in AMR systems. In both cases the direction of an external magnetic field can be determined unambiguously for a range of 0° to 180°.

In principle, determination of a direction of a magnetic field requires an assembly of several AMR or GMR spin-valve elements, that may be arranged e.g., in a bridge circuit, such as a Wheatstone bridge. In such arrangements AMR and GMR spin-valve elements have to be mutually rotated in the plane of sensitivity. Hence, their direction of anisotropy has to point in different directions. This requires manual orientation of selected GMR spin-valves, which is rather disadvantageous in the framework of a mass production process. Alternatively, during a production process, selected GMR spin-valves might become subject to an additional annealing process that serves to rotate the pinning direction of selected elements with respect to the pinning direction of the unselected spin-valve elements. Manual re-orientation as well as performing sophisticated annealing processes feature disadvantages with respect to production costs and production efficiency, especially in mass production processes. For directional magnetic sensors it would be advantageous to make use of an assembly of AMR or GMR spin-valve elements that feature a common pinning direction or a common direction of anisotropy.

Moreover, for some applications like magnetic card readers, magnetic gradiometers or magnetic encoders, a couple of magnetoresistive elements must be positioned and separated by a gap of several tens or hundreds of micrometers or even millimeters. In particular, mass production processes become very complicated when two or more magnetoresistive elements have to be separated in a direction perpendicular to the plane of sensitivity of the planar magnetoresistive elements. Typically, the magnetoresistive elements are manufactured by depositing thin film layers on a substrate. The plane of the layers, e.g., the x-y plane determines the plane in which the magnetoresistive element is sensitive to a magnetic field. Arranging various magnetoresistive elements at a large distance in the z direction requires deposition of a very thick layer of insulating material. Deposition of a layer featuring a thickness of 10 μm up to millimeters by means of sputtering is extremely cost- and time-intensive and therefore undesirable.

It would therefore be desirable to provide a magnetic sensor making use of magnetoresistive layered structures featuring a common pinning direction or direction of anisotropy and providing unequivocal determination of the direction of an applied external magnetic field as well as to provide a magnetic sensor being capable to measure a magnetic field component pointing in a direction in which the magnetoresistive elements are not sensitive to a magnetic field.

SUMMARY OF THE INVENTION

The present invention provides a magnetic sensor that comprises at least a first and at least a second structure of soft-magnetic material that are spatially separated and define a first gap therebetween. The first and second structure of soft-magnetic material are adapted to form a gap magnetic field pointing in a direction substantially perpendicular to the elongation of the first gap in the vicinity of the first gap in response to an external magnetic field. Additionally, the magnetic sensor comprises at least a first magnetoresistive layered structure that is positioned in the vicinity of the first gap including inside the first gap and that is sensitive to the gap magnetic field.

In another aspect, the invention provides a method of measuring an external magnetic field pointing in a first direction that is substantially parallel to the surface normal of an at least first magnetoresistive layered structure that is deposited on a planar substrate. The inventive method comprises measuring the external magnetic field by means of the at least first magnetoresistive layered structure and comprises applying the external magnetic field to the planar substrate that has at least one structure of soft-magnetic material that is adapted to at least partially deflect the external magnetic field in a direction that is substantially parallel to the surface of the at least first magnetoresistive layered structure. The at least one structure of soft-magnetic material is arranged in the vicinity of the at least first magnetoresistive layered structure. The method further comprises measuring the electrical resistance of the at least first magnetoresistive layered structure that depends on the magnitude and/or direction of the magnetic field that is deflected by the at least one structure of soft-magnetic material. Finally, the method comprises determining the magnitude and/or direction of the external magnetic field by means of the electrical resistance of the at least first magnetoresistive layered structure.

Other aspects and advantages of the present invention will become apparent from the following detailed description, which, when taken in conjunction with the drawings, illustrate by way of example the principles of the invention.

BRIEF DESCRIPTION OF THE DRAWINGS

For a fuller understanding of the nature and advantages of the present invention, as well as the preferred mode of use, reference should be made to the following detailed description read in conjunction with the accompanying drawings.

DETAILED DESCRIPTION

The following description is the best mode presently contemplated for carrying out the present invention. This description is made for the purpose of illustrating the general principles of the present invention and is not meant to limit the inventive concepts claimed herein. Further, particular features described herein can be used in combination with other described features in each of the various possible combinations and permutations.

Figure 1:
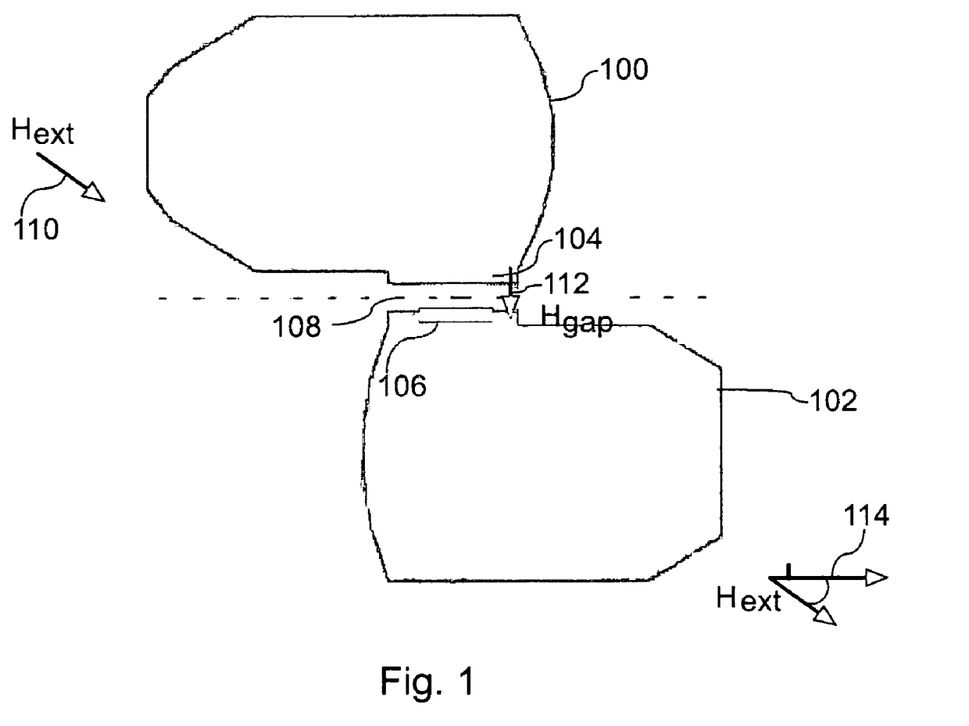
FIG. 1 schematically illustrates the magnetic sensor in a planar geometry.

FIG. 1 shows a top view illustration of one embodiment of the inventive magnetic sensor in a planar geometry. The magnetic sensor has a first soft magnetic structure 100 and a second soft-magnetic structure 102 that are spatially separated and form a first gap 108. Soft-magnetic materials are those with a magnetic permeability significantly higher than that of free space. Typically, soft-magnetic materials cannot be permanently magnetized to a significant degree. These properties allow soft-magnetic materials to conduct magnetic flux in much the same way as copper wires are used to conduct electric currents. Common examples of soft-magnetic materials are pure iron, nickel-iron steels such as Permalloy, FeAlN, CoFe, CoZrTA, etc.

The magnetic sensor further includes a third soft-magnetic structure 104 and fourth soft-magnetic structure 106. Also, the magnetic sensor has at least one magnetoresistive layered structure that is positioned inside or in the vicinity of the gap 108 formed by first and second soft-magnetic structures 100, 102. Here, the magnetoresistive layered structure, typically implemented as AMR or GMR spin-valve element is not explicitly shown. The AMR or GMR spin-valve element is adapted to detect a gap magnetic field (Hgap) 112 evolving across the gap 108 between the two soft-magnetic structures 100, 102.

In particular, soft-magnetic structures 100, 102 feature such a geometry and are arranged in such a way that the gap magnetic field 112 always points across the gap 108 either upwards or downwards. Hence, the gap magnetic field 112 substantially points in a direction that is substantially perpendicular to the direction of elongation of the gap 108 in response to an external magnetic field 110 that has at least one component that points in a direction substantially parallel to the elongation of the first gap. In the illustrated embodiment, the direction of elongation of the gap 108 is horizontal as indicated by the dashed line.

Applying an external magnetic field (Hext) 110 leads to generation and formation of the gap magnetic field 112. For instance, applying the external magnetic field 110 in a horizontal direction, left hand sides of soft-magnetic structures 100, 102 may feature a magnetic north pole whereas right hand sides of soft-magnetic structures 100, 102 may feature a magnetic south pole. Consequently, in the vicinity of the gap 108, soft-magnetic structure 100 represents a magnetic south pole whereas soft-magnetic structure 102 represents a magnetic north pole. Consequently, the gap magnetic field 112 may point upwards even though external magnetic field 110 does not comprise such a component.

Varying the angle of incidence of the external magnetic field 110 with respect to a reference direction 114 has substantially no net effect on the direction of the gap magnetic field 112. At a distinct angle of the external magnetic field, also denoted as flipping angle, the direction of the gap magnetic field 112 may flip. This flipping angle strongly depends on the geometry of the soft-magnetic structures 100, 102 as well as on their mutual arrangement.

Thus, the gap magnetic field either points in a first or in a reversed second direction that are substantially perpendicular to the direction of elongation of the first gap. Additionally, the magnetoresistive layered structure that is arranged in the vicinity of the first gap is adapted to provide an output that is indicative of the first or second direction. Hence, the magnetoresistive layered structure may provide an electrical resistance depending on a direction of an applied magnetic field.

The direction of the gap magnetic field pointing either in e.g., positive or negative y-direction is governed by the orientation of the external magnetic field. Depending on the geometry of the at least first and second soft-magnetic structures and their mutual arrangement, direction of the gap magnetic field may flip for a distinct orientation of the external magnetic field. This distinct orientation may also be referred to as flip angle. Typically, the gap magnetic field repeatedly flips when the flip angle is increased by 180°.

In this way, the inventive magnetic sensor provides north-south detection of an external magnetic field. In combination with other AMR or GMR spin-valve elements, the direction of the externally applied magnetic field can be unequivocally determined over a range of 0° to 360°. Hence, the inventive magnetic sensor serves as a north-south sensor and therefore provides an effective means for eliminating the 180° ambiguity of conventional directional magnetic sensors.

The soft-magnetic structures 100, 102 may feature such a geometry and may be arranged in such a way that a gap magnetic field is still generated when the externally applied magnetic field does not feature a component that points across the gap. For example, when the first and second soft-magnetic structures are separated along the y-direction, the elongation of the gap may point in the x-direction, when assuming a planar geometry of the magnetic sensor. Applying an external magnetic field in an arbitrary direction in the x-y plane then leads to formation of the gap magnetic field in either positive or negative y-direction. Even if the external magnetic field substantially points in the x-direction, i.e., in the direction of elongation of the gap, a gap magnetic field pointing in a substantially perpendicular direction is still formed and can be measured and detected by means of the magnetoresistive layered structure. Also, in that case when the external magnetic field substantially points across the gap, the gap magnetic field is still generated and can be measured. Hence external and gap magnetic fields become substantially perpendicular.

Soft-magnetic structures 104, 106 preferably feature a lower magnetization saturation threshold than soft-magnetic structures 100, 102. Soft-magnetic structures 104, 106 may feature a much smaller planar geometry than first and second soft-magnetic structures. Also, third and fourth soft-magnetic structures 104, 106 may comprise a different soft-magnetic material than first and second soft-magnetic structures 100, 102, thus leading to a different magnetization saturation threshold. Moreover, third and fourth soft-magnetic structures 104, 106 may feature a smaller thickness than the first and second soft-magnetic structures 100, 102. This also may lead to the desired lower magnetization saturation threshold, even when first and third as well as second and fourth soft-magnetic structures comprise the same material. For example, the first and second soft-magnetic structures 100, 102 may feature a thickness in the range of micrometers, whereas the third and fourth soft-magnetic structures 104, 106 feature a thickness in the sub-micrometer range.

Soft-magnetic structures 104, 106 effectively serve as flux limiters, because even for external magnetic fields 110 of low magnitude, the flux limiters 104, 106 may provide a saturated magnetization. Typically, the magnetoresistive layered structure is arranged in between soft-magnetic structures 104, 106 and effectively serves to measure the gap magnetic field between soft-magnetic structures 104, 106. Since soft-magnetic structures 104, 106 are preferably in a saturated magnetization state, the magnitude of the evolving gap magnetic field 112 may remain substantially constant even for a large range of angles α between the external magnetic field 110 and the reference direction 114.

The magnetoresistive element provides effective detection whether gap magnetic field 112 points upwards or downwards. The magnetoresistive element is preferably oriented in the vicinity of the gap 108 in such a way that, for instance, for an upwards pointing gap magnetic field, adjacent layers of the magnetoresistive element are magnetized in a parallel orientation and respective layers are magnetized in an anti-parallel way when the gap magnetic field 112 points downwards. Consequently, if the magnetoresistive element is e.g., implemented as a GMR spin-valve, for upwards or downwards pointing gap magnetic fields its resistance will either be minimal or maximal.

Minimal and maximal magnitude of the resistance of a GMR spin-valve element can be unequivocally assigned to a parallel or anti-parallel alignment of the coupled ferromagnetic and anti-ferromagnetic layers. Typically, the direction of the gap magnetic field 112 remains constant over an angular range of α from 0 to 180°. Consequently, the illustrated sensor serves as a north-south sensor of a magnetic field. It effectively allows a determination of whether external magnetic field 110 has an angle with respect to the reference direction 114 in a range from 0 to 180° or from 180 to 360°.

Depending on the concrete geometry of first, second, third and fourth soft-magnetic structures, third and fourth soft-magnetic structures might be entirely saturated for a first angular range. Hence, the gap magnetic field features a constant magnitude over this first angular range. The gap magnetic field may also have a substantially constant direction over the first angular range. In the vicinity of the flip angle, the direction of the gap magnetic field may deviate from the predominant direction across the gap.

The flux limiters not only serve to maintain the magnitude of the gap magnetic field 112 irrespective of angle α but they also serve to vary the gain factor of the magnetic sensor in dependence on the magnitude of the external magnetic field 110. Apart from magnitude and direction of external magnetic field 110 the magnitude of gap magnetic field 112 also depends on the geometry and size of the gap 108. In particular, for small gap sizes, the magnitude of the gap magnetic field 112 may even exceed the magnitude of the externally applied magnetic field 110. For a magnetic north-south sensor it would be advantageous to have a gap magnetic field 112 irrespective of magnitude and/or direction of the external magnetic field 110. Therefore, it would be advantageous to amplify rather small external magnetic fields and to attenuate rather large external magnetic fields 110.

Implementation of flux limiters 104, 106 may fulfill this requirement. For rather small external magnetic fields, flux limiters 104, 106 may not be magnetized above their magnetization saturation threshold. In this case, the gap 108 typically featuring a gap size in the range of micrometers may provide a sufficient amplification of the external magnetic field 110. However, if the external magnetic field 110 is rather large in magnitude, soft-magnetic structures 104, 106 might be entirely saturated and their magnetic properties become similar to the magnetic properties of free space. Hence, the effective size of the gap 108 increases leading to a decreasing gain factor of the gap 108. In this way, the illustrated arrangement provides variable gain, i.e., large gain for low magnetic fields and low gain for large magnetic fields. Since the magnetoresistive element may only operate within a predefined range, the effective operation range of the entire magnetic sensor can be effectively expanded.

Soft-magnetic structures of variable magnetization saturation threshold can be designed by varying the thickness of the planar structures. For instance, soft-magnetic structures 100, 102 may feature a thickness of a few micrometers, whereas soft-magnetic structures 104, 106 may feature a substantially smaller thickness, e.g., in a range below one μm.

According to one embodiment of the invention, the first, second, third and fourth structures of soft-magnetic material 100, 102, 104, 106 comprise a planar geometry and are arranged on a planar substrate. Hence, the structures of soft-magnetic material 100, 102, 104, 106 may be produced by a deposition process, like sputtering or electroplating, in large numbers in mass production. In a similar way also one or more magnetoresistive layered structures may also be produced by means of depositing the various layers on a planar substrate, such as a wafer.

Figure 2:
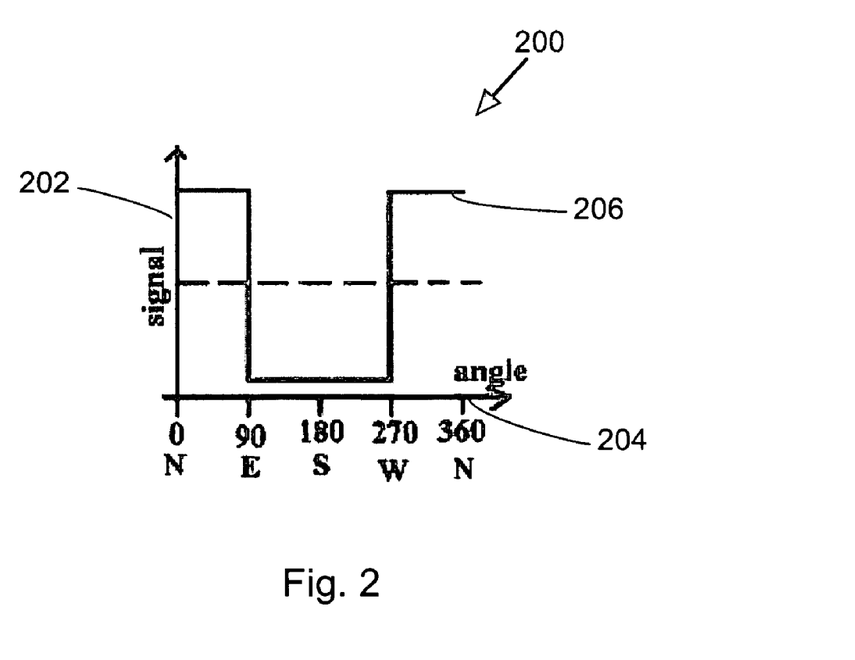
FIG. 2 shows a diagram of an ideal output of the magnetic sensor.

FIG. 2 illustrates an ideal diagram 200 showing output signal of the magnetoresistive element 202 versus angle α 204 of the externally applied magnetic field 110 with respect to the reference direction 114. The diagram 200 features a curve 206 that has a lower and a upper level. For angles between 90° and 270°, the signal is at a lower level and in a range from 270° to 90° the signal 202 is at a higher level. Measuring the signal 202 and comparing the signal with some threshold value indicated by the dashed line allows discrimination of whether the external applied magnetic field points in a direction between 90° and 270° or in a direction between 270° and 90°. Since diagram 200 only represents an ideal curve 206, in realistic implementations, at 90° and 270° the curve may not feature an infinite slope but may have a certain angular range where the signal 202 is neither at the upper or lower level.

Figure 3:
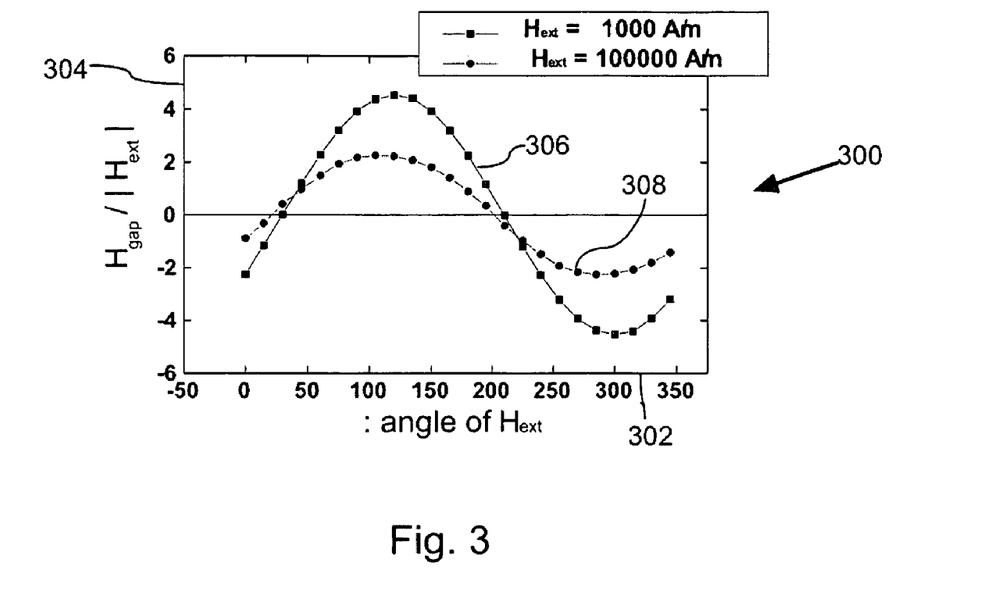
FIG. 3 illustrates the variable gain of the magnetic sensor in a polar diagram.

FIG. 3 illustrates a diagram 300 showing gain factor 304 of the sensor versus angle α 302 of the external magnetic field. In particular, diagram 300 illustrates two curves 306, 308 for different magnitudes of the external magnetic field. Curve 306 corresponds to a magnitude of 1,000 A/m and curve 308 corresponds to 100,000 A/m. The amplitude of the sinusoidal curve 306 is rather large for the relatively low magnitude of the applied external magnetic field whereas amplitude of curve 308 is rather low for a hundred times stronger external magnetic field. Hence the gain factor of an assembly shown in FIG. 1 decreases with increasing magnitude of applied external magnetic field 110.

Further, from diagram 300 it can be seen that the gap magnetic field has non-zero magnitude for α=0. The angle α for which the gap magnetic field has a zero magnitude is also denoted as phase shift θ that may depend on the magnitude of the external magnetic field. For instance, phase shift of curve 306 can be determined to almost 30° and phase shift of curve 308 can be determined to approximately 22°. The phase shift also depends on the internal geometry of the soft-magnetic structures 100, 102 and on their mutual orientation and position. For dedicated applications, the phase shift of an assembly of at least two soft-magnetic structures and a magnetoresistive element may be appropriately designed by varying geometry of soft-magnetic structures and/or varying relative positions of soft-magnetic structures with respect to the position of the magnetoresistive element.

Figure 4:
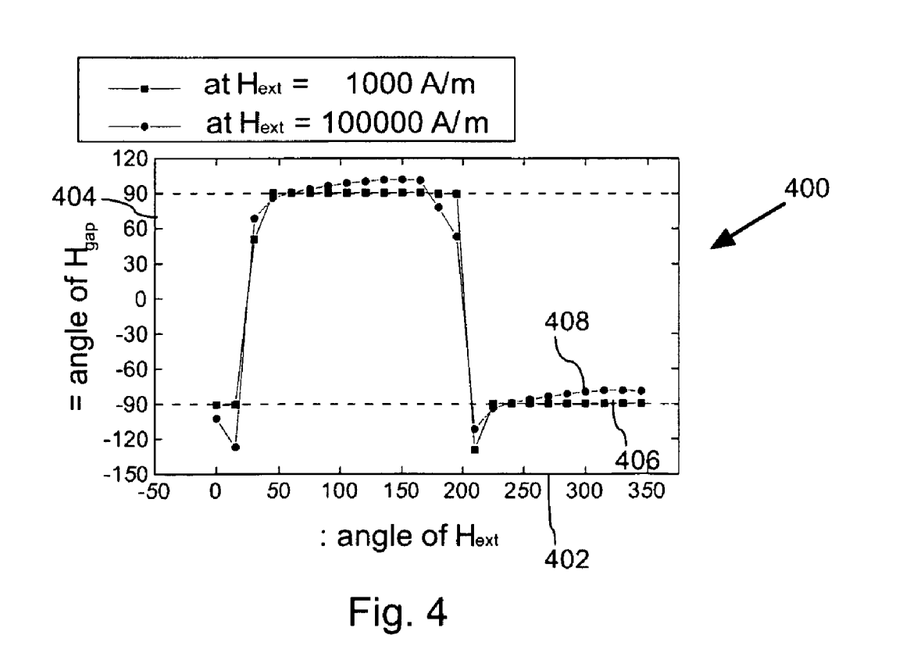
FIG. 4 illustrates the angle of the gap magnetic field versus angle of external magnetic field, FIG. 5 schematically shows geometric arrangement of magnetoresistive elements and soft-magnetic structures forming a bridge circuit.

FIG. 4 illustrates a corresponding diagram 400 depicting the angle of the gap magnetic field 404 versus angle of incidence α 402 of the external magnetic field. Here, curve 408 corresponds to an external magnetic field of curve 308 of diagram 300 and curve 406 corresponds to curve 306 of diagram 300. From diagram 400 it can be clearly seen that the angle of the gap magnetic field 404 is either 90° or −90°, almost irrespective of the magnitude of the external magnetic field. Over almost a range of 180° the two curves 406, 408 remain at a constant level. Curves 408, 406 are therefore directly comparable with the ideal curve 206 of FIG. 2 except that curves of FIG. 4 represent the angle of the gap magnetic field 112 (FIG. 1), and curve 206 corresponds to an output signal of a north-south sensor. It is therefore advantageous to make use of a magnetoresistive element featuring a high sensitivity, i.e., featuring its maximum resistance already for rather low magnitudes of the gap magnetic field.

In such a configuration the angular region, where adjacent layers of a magnetoresistive element are not parallel or anti-parallel, become rather small. Consequently, for large angular ranges of α resistance of the magnetoresistive element may either be maximal or minimal thus allowing for a straightforward and uncomplicated signal analysis.

Further, from diagram 400 also a blind angular range of the magnetic sensor can be determined. This blind angular range may be defined as the angular range of angle α for which the angle of the gap magnetic field 404 is neither in the range of 90° nor in the range of −90°. Over a certain blind range in the vicinity of the flipping angle magnitude as well as orientation of the gap magnetic field may vary from the constant magnitude and/or direction. For instance, for curve 406 this blind angular range may extend from 20° to approximately 50°. Consequently, for this particular angular range and the corresponding angular range for α around 200°, the magnetic sensor may not operate properly. However, in a bridge circuit arrangement this blind range might be covered by another magnetoresistive element.

Figure 5:
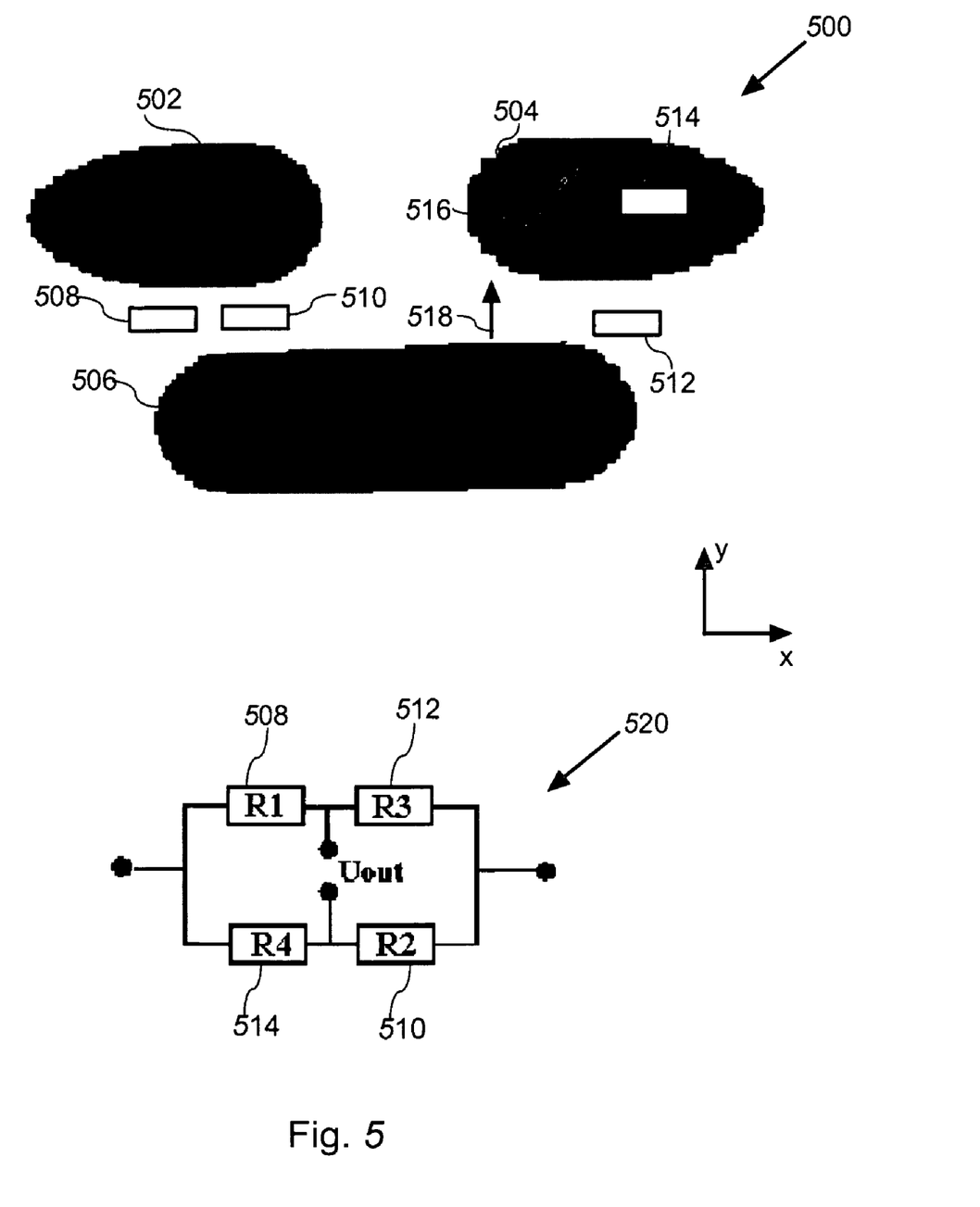

FIG. 5 illustrates a top view of an assembly 500 of four magnetoresistive elements 508, 510, 512, 514 and three soft-magnetic structures 502, 504, 506. Gap magnetic fields 518 between the two gaps either point in an upwards or downwards direction. The external magnetic field is denoted as arrow 516. Magnetoresistive elements 508, 510, 512, 514 are electrically inter-connected as illustrated in the circuit diagram 520. In particular, magnetoresistive elements 508 and 510 are positioned in the gap between soft-magnetic structure 502 and soft-magnetic structure 506. Magnetoresistive element 512 is positioned in the vicinity of the gap formed between soft-magnetic structure 506 and soft-magnetic structure 504. The fourth magnetoresistive element 514 is positioned on top or underneath soft-magnetic structure 504. In essence, magnetoresistive element 514 is effectively shielded from the external magnetic field 516 by means of soft-magnetic structure 504. Therefore, magnetoresistive element 514 effectively serves as a reference resistor of the illustrated Wheatstone bridge 520.

Depending on the phase offset, the output of the bridge circuit 520 may feature up to four different, substantially constant output levels over an angular range of 0° to 360° of the orientation of the external magnetic field. Hence, the bridge circuit allows discrimination of whether the external magnetic field points in a north, east, south or west direction. Combining this bridge circuit with other magnetoresistive elements featuring an angular dependency on the orientation of an applied magnetic field allows creation of a 360° sensor.

Magnetoresistive elements 508, 510, 512, 514 are all oriented in a common direction, i.e., when implemented as GMR spin-valve elements, magnetoresistive elements 508, 510, 512, 514 are annealed along a common direction. Magnetoresistive elements 508, 510, 512, 514 are sensitive to magnetic fields in the x-y plane. When for instance an external magnetic field is applied in a horizontal direction, the gap magnetic fields in the different gaps may point in different directions. For instance, when soft-magnetic structures 502, 504, 506 feature a magnetic south pole to the left hand side and a magnetic north pole to the right hand side, an evolving gap magnetic field across the gap between structure 502 and structure 506 may point downward whereas a gap magnetic field across the gap formed by soft-magnetic structure 506 and soft-magnetic structure 504 points upwards. Hence, the two different gaps and corresponding gap magnetic fields feature a different flipping angle. Hence, diagrams such as diagram 300 (FIG. 3) and 400 (FIG. 4) feature different horizontal offsets at the positions where magnetoresistive elements 508, 510 and 512 (FIG. 5) are positioned.

For example, when implemented as GMR spin-valve elements, the magnetoresistive layered structures all feature the same pinning orientation. This allows use of equally pinned, hence equally annealed GMR spin-valve elements in an application dedicated for unequivocal determination of an orientation of an external magnetic field. Hence, manual arranging and orienting of particular GMR spin-valve elements as performed in the prior art does no longer have to be performed. Instead, a large number of magnetoresistive layered structures having equal properties can be produced in a mass production process and implemented in directional magnetic sensor applications.

Figure 6:
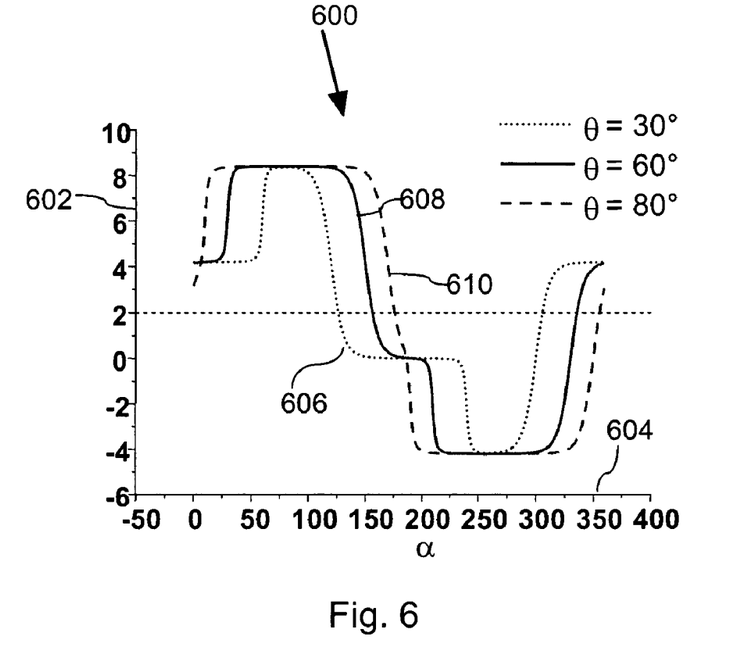
FIG. 6 illustrates the output of the bridge circuit in a polar diagram, FIG. 7 schematically shows a cross sectional view of the magnetic sensor in a bulk geometry.

FIG. 6 illustrates the output signal of the bridge given by the circuit diagram 520 (FIG. 5) for various phase shift angles $\theta$ between characteristic curves of magnetoresistive elements 508, 510, 512 (FIG. 5). Diagram 600 of FIG. 6 illustrates bridge output in Millivolts versus angle $\alpha$ of the external magnetic field. The three curves 606, 608, 610 correspond to phase shifts of $\theta=30°$, $60°$ and $80°$, respectively. For a phase shift of almost $90°$, the output signal given by curve 610 features two distinct levels around 8 mV and −4 mV, each of which being constant for an angular range of more than $100°$ of $\alpha$. Curve 610 effectively allows triggering an output of a north-south sensor when e.g., the signal 602 is above or below a predefined threshold. For instance choosing the upper threshold around 6 mV and choosing the lower threshold around −3 mV, the angular range for which no decisive output signal can be generated decreases to e.g., $160$ to $180°$ and to $350$ to $10°$. Consequently, the blind angular range of such a north-south sensor is as small as two times $20°$.

Curve 606 corresponds to a phase shift $\theta=30°$ and shows four distinct levels of almost constant output voltage.

These levels of constant output voltage allow discrimination and determination of a north, east, south, and west direction of the applied external magnetic field. Such a north, east, south and west sensor may effectively make use of comparing the output voltage 602 with corresponding threshold levels. In a similar way, curve 608 represents a bridge output versus $\alpha$ for a phase shift of $\theta=60°$ between the various magnetoresistive elements 508, 510, 512 and 514 (FIG. 5).

According to one embodiment of the invention, the output of the bridge circuit 520 (FIG. 5) comprises as least two different substantially constant levels over an angular range of $360°$ of the angle between the direction of the external magnetic field and the reference direction. This might be realized when the flipping angles of the gap magnetic fields measured by the various magnetoresistive layered structures is around $90°$. In this case the bridge output more or less resembles the output of a single magnetoresistive element sandwiched between first and second soft-magnetic structures. With this embodiment a north-south magnetic sensor can be realized by detecting whether the bridge output is above or below a specific threshold value.

According to a further embodiment of the invention, the output of the bridge circuit comprises four different substantially constant levels over the second angular range. This can be effectively realized when the gap magnetic fields feature different flipping angles and when the corresponding angular output diagrams of the respective magnetoresistive layered structures feature different phase shifts of e.g., $30°$ to $60°$. The phase shift has to be in a range larger than the angular range for which the output of a magnetoresistive element is not constant, i.e., in the vicinity of flipping of the gap magnetic field. The angular range for which the gap magnetic field is subject to flipping may also be denoted as a blind angular range.

When the output of the bridge circuit comprises four different levels, the magnetic sensor is adapted to serve as a north, east, south, west sensor and allows determining the absolute direction of an applied magnetic field in combination with a directional sensitive magnetoresistive element that may feature a $90°$ ambiguity.

Figure 7:
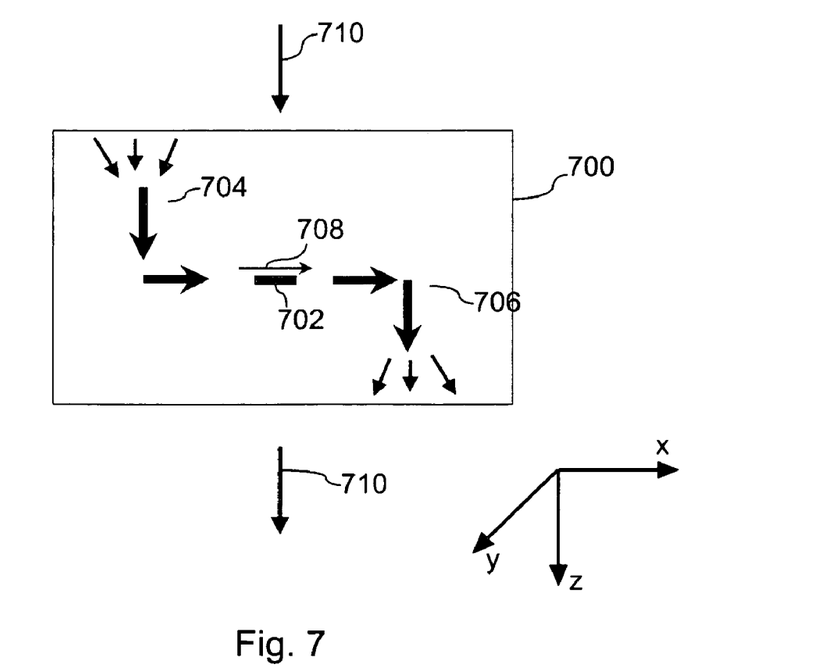

FIG. 7 shows a representative cross sectional view of a sensor device 700, where the soft-magnetic structures 704, 706 are implemented as bulk soft-magnetic structures. The cross sectional view shown in FIG. 7 corresponds to a cross section in the x-z plane. The magnetoresistive layered structure 702 has a sensitivity in the x-y plane and is therefore unable to sense and to determine an external magnetic field 710 pointing in the z-direction. However, the particular geometry of the bulk soft-magnetic structures 704, 706 as well as their mutual arrangement effectively allows deflection and re-orientation of the external magnetic field 710 into the x-direction. In this way, magnetoresistive element 702 may determine magnitude and/or direction of the gap magnetic field 708 being oriented in the x-y plane. Hence, an external magnetic field can be locally deflected and re-oriented allowing measurement of the external magnetic field by means of measuring the gap magnetic field. When for example the external magnetic field points in a direction in which the magnetoresistive layered structure is rather insensitive, by redirecting and deflecting at least a component of the external magnetic field, the magnetoresistive layered structure effectively becomes able to measure components of a magnetic field to which the magnetoresistive layered structure is inherently insensitive.

In this way the sensor device 700 effectively provides local deflection and re-orientation of a magnetic field and allows measuring a magnetic field 710 by means of a magnetoresistive layered structure 702 that is inherently insensitive to the magnetic field 710. When appropriately calibrated, the sensor device 700 allows determination of a magnitude of an external magnetic field 710 by measuring the magnitude of a gap magnetic field 708 provided that neither bulk soft-magnetic structures 704, 706 are magnetized by the external magnetic field 710 above a magnetization saturation threshold. Further, in contrast to the north-south sensor, magnetoresistive layered structure 702 may not be operated in a saturation regime.

For example, a magnetoresistive element may have a planar structure in the x-y plane and is therefore only capable to detect and to measure magnetic fields in this dedicated plane. Such magnetoresistive elements are rather insensitive to z components of a magnetic field. The at least first and second structures of soft-magnetic material now provide re-orientation and to deflection of a z component of an external magnetic field into the x-y plane and therefore enable measuring of components of a magnetic field that are substantially parallel to the surface normal of the involved magnetoresistive elements.

This embodiment is preferably applicable in configurations where a particular component of a magnetic field has to be measured at two different positions, where the positions are separated in a direction perpendicular to the direction of the component that is to be measured. For example measuring x- or y-component of a magnetic field at different z positions or measuring a z-component of a magnetic field at different positions with respect to x or y, provided that the sensitivity of the used magnetoresistive element coincides with the x-y plane.

Figure 8:
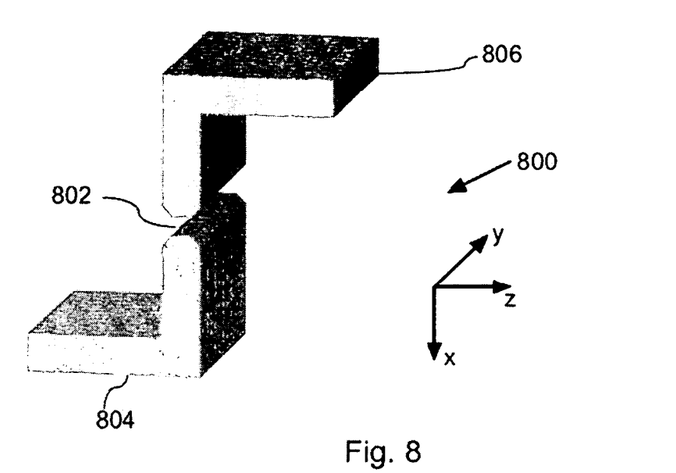
FIG. 8 shows a perspective illustration of the bulk geometry of soft-magnetic structures.

FIG. 8 shows a perspective illustration of an assembly 800 of bulk soft-magnetic structures 804 and 806. Bulk soft-magnetic structures 804, 806 form a gap 802 and are adapted to redirect and deflect a magnetic field pointing in the z-direction into a gap magnetic field pointing in the x-direction. Hence, bulk soft-magnetic structures 804 and 806 correspond to bulk soft magnetic structures 704, 706 of FIG. 7, respectively.

Figure 9:
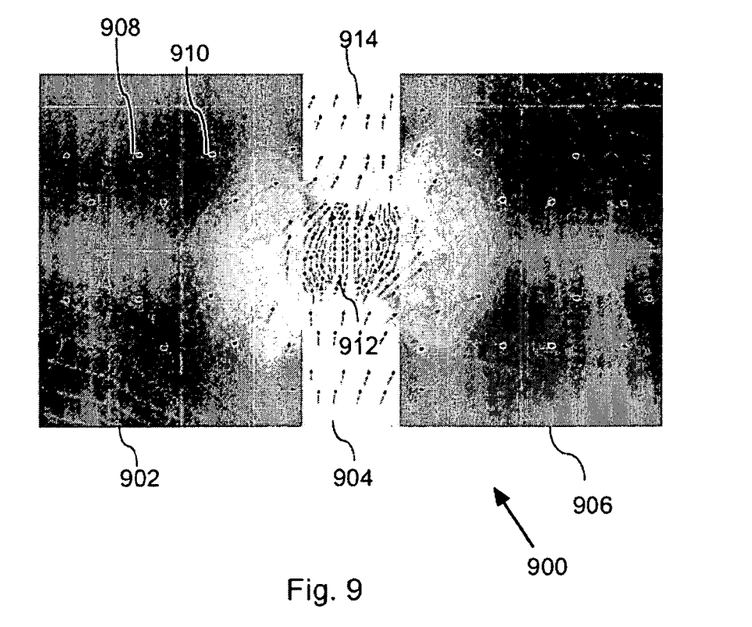
FIG. 9 shows a simulation of local magnetic field deflection, FIG. 10 schematically illustrates a particular sensor application.

FIG. 9 illustrates a simulated magnetic field distribution 900 around the gap area 802 of the assembly 800 shown in FIG. 8. With continued reference to FIG. 9, the simulated magnetic field distribution 900 can be roughly divided in three parts, namely a left part 902, a central part 904 and a right part 906. Left and right parts 902, 906 correspond to left and right part of non-magnetic bulk material. The central part 904 represents the soft magnetic bulk material 804 (FIG. 8) with the gap 802 (FIG. 8) in its center.

The small arrows 908, 910, 912 and 914 correspond to the directions of local magnetic fields. As can be seen, local magnetic fields 908 and 910 of the left part of FIG. 9 point to the right direction as well as the local magnetic fields in the right part 906 do. In the central part 904, the local magnetic fields 912 and 914 point in an upwards direction as indicated by the small arrows. Here, local magnetic field 914 represents a local magnetic field in the bulk of the soft magnetic material, whereas local magnetic field 912 represents the gap magnetic field between the two bulk soft-magnetic structures 804 and 806 (FIG. 8).

Hence, referring to FIG. 8, the assembly 800 of bulk soft-magnetic structures 804, 806 effectively serves to locally deflect and to locally re-orient an externally applied magnetic field. By shaping the tips of the soft-magnetic material 804 around the gap 802, the magnetic flux in the gap can be locally influenced. In the illustrated example of FIG. 8, the tips are shaped in that way that the magnetic gap flux in the center of the gap always points in a direction parallel to the x-axis.

By arranging a magnetoresistive element inside the gap 802 that is sensitive to magnetic fields in the x-y plane, the strength of a z-component of a magnetic field can in principle be measured by means of the magnetoresistive element being inherently insensitive to z-components of externally applied magnetic fields. This local re-orientation and deflection of a magnetic field component is particularly advantageous for applications where a component of a magnetic field has to be measured at different positions that are separated along a direction substantially perpendicular to the direction of the magnetic field component.

Figure 10:
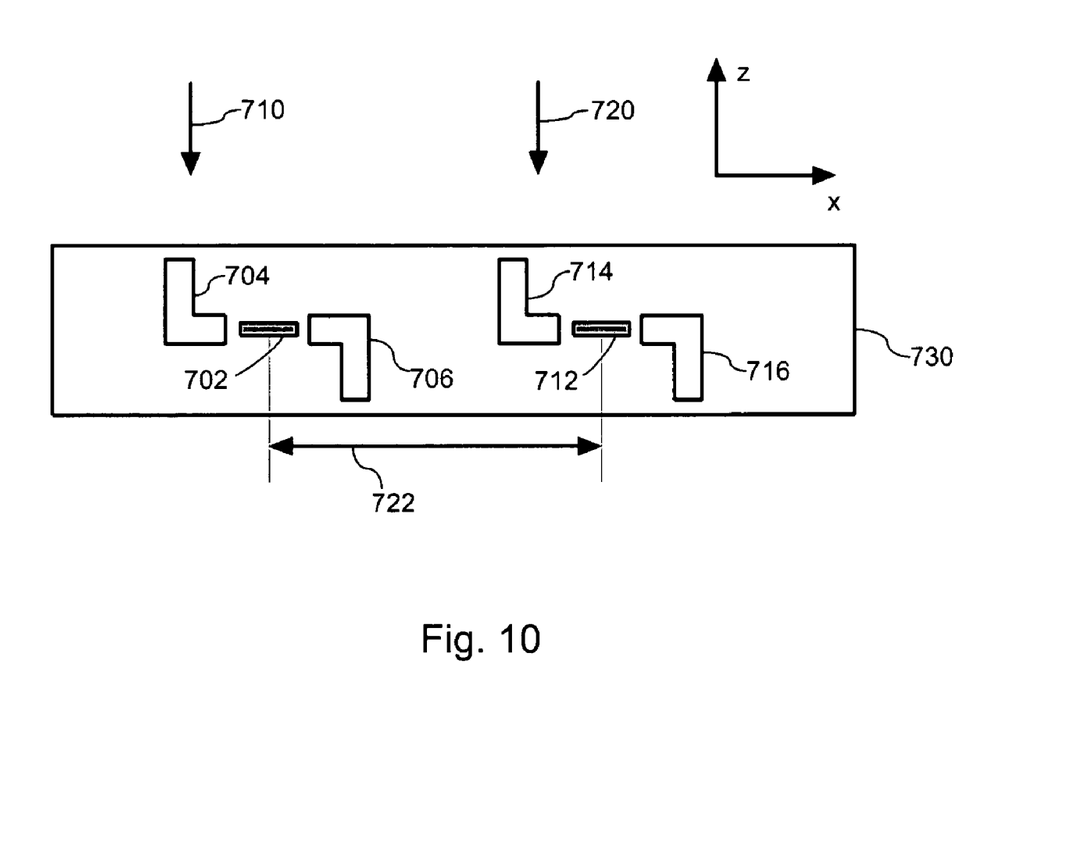

FIG. 10 illustrates an embodiment of such a magnetic sensor device 730. In principle, sensor device 730 comprises two sensors 700 that are arranged and positioned at two different x positions.

The first sensor of the sensor device 730 comprises two bulk soft-magnetic structures 704 and 706 and a magnetoresistive element 702. The second sensor comprises similar components, namely bulk soft-magnetic structures 714, 716 as well as magnetoresistive element 712. Both magnetic sensors are separated by a distance 722 along the x-direction. Further, the magnetoresistive layered structure 702 is adapted to measure a z-component 710 of an external magnetic field whereas magnetoresistive element 712 is adapted to measure a z-component 720 of an external magnetic field. Both z-components 710, 720 are locally deflected and re-oriented in the vicinity of magnetoresistive elements 702, 712, respectively.

In this way magnetic sensor device 730 effectively serves to measure z-components of external magnetic fields 710, 720 at different x positions.

Implementing such a device would normally require depositing an insulating layer on top of a magnetoresistive element and subsequently depositing an additional magnetoresistive element on top of the insulating layer. In this case the insulating layer has to provide a thickness that corresponds to the distance 722 of the sensor device 730. Deposition of such thick layers is rather expensive, time intensive and hence very ineffective. With the present invention of locally deflecting and redirecting magnetic flux, such sensor devices and their magnetoresistive elements 702, 712 can be deposited on a common substrate during a common deposition process. Consequently, a large variety of magnetic sensors being sensitive to the z component of a magnetic field and being separated in the x-y plane can be produced on a planar substrate without a need to deposit rather thick separation layers between the sensor elements. Sensor devices providing measuring a magnetic field component at various positions that are separated along a direction substantially perpendicular to the direction of the magnetic field component may be of high value for applications in the framework of magnetic card readers, magnetic gradiometers as well as magnetic encoders.

Implementing the teachings above, a magnetic north-south sensor device may comprise one or more inventive magnetic sensors and a control unit that is adapted to assign an output of the magnetic sensor to an angular range of an angle α between the direction of the external magnetic field and a reference direction.

In another embodiment, the invention includes a magnetic sensor device that comprises at least a first and a second inventive sensor that are arranged on a planar substrate and that are adapted to generate an output in response to at least a component of the external magnetic field that points in a direction substantially perpendicular to the planar surface of the magnetoresistive structures of the at least first and second sensors.

In a further embodiment, the invention includes a magnetic card reading device that comprises and makes use of at least one of the magnetic sensors or magnetic sensor devices.

In yet another embodiment, the invention includes a magnetic gradiometer that comprises and makes use of at least one of the magnetic sensors or magnetic sensor devices.

In a further embodiment, the invention includes a magnetic encoding device that comprises and makes use of at least one of the magnetic sensors or magnetic sensor devices.

In still another embodiment, the invention includes a method of measuring an external magnetic field pointing in a first direction that is substantially parallel to the surface normal to an at least first magnetoresistive layered structure that is deposited on a planar substrate. The inventive method comprises measuring the external magnetic field using the at least first magnetoresistive layered structure and comprises applying the external magnetic field to the planar substrate that has at least one structure of soft-magnetic material that is adapted to at least partially deflect the external magnetic field in a direction that is substantially parallel to the surface of the at least first magnetoresistive layered structure.

The at least one structure of soft-magnetic material is arranged in the vicinity of the at least first magnetoresistive layered structure. The method further comprises measuring the electrical resistance of the at least first magnetoresistive layered structure that depends on the magnitude and/or direction of the magnetic field that is deflected by the at least one structure of soft-magnetic material. Finally, the method comprises determining the magnitude and/or direction of the external magnetic field using the electrical resistance of the at least first magnetoresistive layered structure.

While various embodiments have been described above, it should be understood that they have been presented by way of example only, and not limitation. Thus, the breadth and scope of a preferred embodiment should not be limited by any of the above-described exemplary embodiments, but should be defined only in accordance with the following claims and their equivalents.

The invention claimed is:

1. A magnetic sensor, comprising:
   at least a first and a second structure of soft-magnetic material being spatially separated and defining a first gap therebetween, the at least first and second structures of soft-magnetic material being adapted to form a gap magnetic field oriented in a direction substantially perpendicular to an elongation of the first gap in a vicinity of the first gap in response to application of an external magnetic field; and
   at least a first magnetoresistive layered structure being positioned towards the first gap and being sensitive to the gap magnetic field,
   wherein the first structure of soft-magnetic material comprises a third structure of soft-magnetic material in the vicinity of the first gap and wherein the second structure of soft-magnetic material comprises a fourth structure of soft-magnetic material in the vicinity of the first gap, the third and fourth structures of soft-magnetic having a lower magnetization saturation threshold than the first and second structures of soft-magnetic material.

2. The magnetic sensor according to claim 1, wherein the gap magnetic field points in at least one of a first and a second direction that are each substantially perpendicular to the elongation of the first gap and wherein the magnetoresistive layered structure is adapted to provide an output that is indicative of the first or second direction.

3. The magnetic sensor according to claim 1, wherein the gap magnetic field has a substantially constant magnitude over a first angular range of an angle between the direction of the external magnetic field and a reference direction.

4. The magnetic sensor according to claim 1, wherein the gap magnetic field has a substantially constant direction over a first angular range 5. The magnetic sensor according to claim 4, wherein the first angular range is from about 0° to about 180°.

6. The magnetic sensor according to claim 1, wherein the first, second, third and fourth structures of soft-magnetic material comprise a planar geometry and are arranged on a planar substrate.

7. The magnetic sensor according to claim 1, wherein the first and second structures of soft-magnetic material comprise a bulk geometry and wherein the first and second structures of soft-magnetic material are adapted to form the gap magnetic field pointing across the gap in response to a component of the external magnetic field pointing in a direction parallel to the surface normal to the magnetoresistive layered structure.

8. The magnetic sensor according to claim 1, the magnetic sensor being sensitive to a component of the external magnetic field pointing in a direction substantially perpendicular to the surface of the first magnetoresistive layered structure.

9. A magnetic north-south sensor device comprising:
   a magnetic sensor according to claim 1, and
   a control unit being adapted to assign an output of the magnetic sensor to an angular range of an angle between the direction of the external magnetic field and a reference direction.

10. A magnetic sensor device comprising at least a first and a second sensor according to claim 1, the at least first and second sensors being arranged on a planar substrate and being adapted to generate an output in response to at least a component of the external magnetic field pointing in a direction substantially perpendicular to the planar surface of the magnetoresistive structures of the at least first and second sensors.

11. A magnetic card reading device comprising at least one magnetic sensor according to claim 1.

12. A magnetic gradiometer comprising at least one magnetic sensor according to claim 1.

13. A magnetic encoding device comprising at least one magnetic sensor according to claim 1.

14. A magnetic sensor, comprising:
   at least a first and a second structure of soft-magnetic material being spatially separated and defining a first gap therebetween, the at least first and second structures of soft-magnetic material being adapted to form a gap magnetic field oriented in a direction substantially perpendicular to an elongation of the first gap in a vicinity of the first gap in response to application of an external magnetic field;
   at least a first magnetoresistive layered structure being positioned towards the first gap and being sensitive to the gap magnetic field;
   a third structure of soft-magnetic material forming a second gap with the first or second structure of soft-magnetic material,
   a second magnetoresistive layered structure being positioned in the first gap,
   a third magnetoresistive layered structure being positioned in the second gap, and
   a resistive element having a predefined electrical resistance.

15. The magnetic sensor according to claim 14, wherein the at least first, second and third magnetoresistive layered structures are sensitive to magnetic fields pointing across the first and second gaps and wherein said magnetoresistive layered structures are oriented in the same direction.

16. The magnetic sensor according to claim 14, wherein the first, second and third magnetoresistive layered structures and the resistive elements are electrically interconnected and form a bridge circuit, wherein the output of the bridge circuit comprises at least two different substantially constant levels over a first angular range of 360° of an angle between a direction of the external magnetic field and a reference direction.

17. The magnetic sensor according to claim 16, wherein the output of the bridge circuit comprises four different levels over the first angular range.

18. A magnetic sensor comprising:
   at least a first and a second structure of soft-magnetic material being spatially separated and defining a first gap therebetween, the at least first and second structures of soft-magnetic material being adapted to form a gap magnetic field oriented in a direction substantially perpendicular to an elongation of the first gap in a vicinity of the first gap in response to application of an external magnetic field;
   at least a first magnetoresistive layered structure being positioned towards the first gap and being sensitive to the gap magnetic field, at least a third and a fourth structure of soft-magnetic material being spatially separated and defining a second gap therebetween, the at least third and fourth structures of soft-magnetic material being formed on a common substrate with the at least first and second structures of soft-magnetic material, the at least third and fourth structures of soft-magnetic material being adapted to form a second gap magnetic field oriented in a direction substantially perpendicular to an elongation of the first gap in a vicinity of the second gap in response to application of an external magnetic field; and at least a second magnetoresistive layered structure being positioned towards the second gap and being sensitive to the second gap magnetic field.

* * * * *